(12) United States Patent
Jameson et al.

(10) Patent No.: US 10,950,405 B1
(45) Date of Patent: Mar. 16, 2021

(54) LOCKING AN ENCLOSED SWITCH, A BUS PLUG OR A PANELBOARD SWITCH

(71) Applicant: Siemens Industry, Inc., Alpharetta, GA (US)

(72) Inventors: Thomas Jameson, Bellefontaine, OH (US); Troy Groehl, Marysville, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/553,515

(22) Filed: Aug. 28, 2019

(51) Int. Cl.
*H01H 71/52* (2006.01)
*H01H 71/02* (2006.01)
*H02B 1/46* (2006.01)

(52) U.S. Cl.
CPC ........ *H01H 71/521* (2013.01); *H01H 71/025* (2013.01); *H02B 1/46* (2013.01); *H01H 2239/032* (2013.01)

(58) Field of Classification Search
CPC ...... H01H 71/521; H01H 71/025; H01H 9/20; H01H 21/06; H02B 1/46; H02G 3/08
USPC ....... 200/43.14, 50.26, 252; 74/526; 174/50, 174/520, 559, 535, 53, 480, 481, 17 R
See application file for complete search history.

(56) References Cited

U.S. PATENT DOCUMENTS

| | | | | |
|---|---|---|---|---|
| 1,330,137 A * | 2/1920 | Clarence | ................. | H01H 9/281 200/43.14 |
| 5,782,341 A * | 7/1998 | Calder | ................... | H01H 9/282 200/43.11 |
| 6,680,445 B1 * | 2/2004 | Oravetz | ................... | H01H 9/20 200/50.33 |
| 6,940,027 B1 * | 9/2005 | Sipe | ....................... | H01H 9/281 200/43.14 |
| 6,992,256 B1 * | 1/2006 | Wiley | ...................... | H01H 3/48 200/321 |

* cited by examiner

*Primary Examiner* — Edwin A. Leon
*Assistant Examiner* — Iman Malakooti

(57) ABSTRACT

An enclosed switch, a bus plug or a panelboard switch with means to lock them in an OFF position are provided. An enclosed switch comprises an operating handle with a first hole situated at a distal end and an enclosure including a cover. The operating handle is disposed external to the enclosure. The cover having a flange including a tab formed with a second hole that is configured to be aligned with the first hole of the operating handle in order to lock the enclosed switch in an OFF position without the use of a handle guard.

14 Claims, 5 Drawing Sheets

LOCKING AN ENCLOSED SWITCH, A BUS PLUG OR A PANELBOARD SWITCH

BACKGROUND

1. Field

Aspects of the present invention generally relate to locking an enclosed switch, a bus plug or a panelboard switch.

2. Description of the Related Art

General duty switches are intended for applications where reliable performance and continuity of service are needed, but where duty requirements are not severe and usual service conditions prevail. (These switches are intended for use primarily with supply circuits rated 240V AC or less where the available fault current is less than 100,000 A when used with Class R or T fuses or 10,000 A max. when used with Class H fuses.) General duty switches feature quick make, quick break visible blade switching action. All copper current carrying parts except for lugs are constructed from copper. General duty switches are both load break and HP rated. They are UL98 listed. Switches are available in 2 and 3 pole versions and in both fusible and non-fusible designs. Both Type 1 and 3 R enclosures are offered. They can be used for both branch and for service entrance applications. Fusible switches take Class H fuses as standard but are easily field convertible to Class R fuses and also to Class J fuses in 100-600 A ratings. 30 A plug fuse switches are also available. General duty switches are pad lockable in the OFF position. The door can also be padlocked in the closed position.

A switch is required by Underwriters Laboratories (UL) to have a provision to enable an operating handle to be locked in an OFF position. A typical switch construction uses a hole in a handle guard and a matching hole in a handle to lock the switch in the OFF position. The disadvantages of this design are increased part numbers, increased part cost and increased assembly cost and time.

Therefore, there is a need for a simplified means to lock an enclosed switch, a bus plug or a panelboard switch.

SUMMARY

Briefly described, aspects of the present invention relate to switches. Means for locking an enclosed switch, a bus plug or a panelboard switch are provided to ensure that an operating handle is locked in an OFF position. This is accomplished by not using a hole in a handle guard rather a formed handle lockout and a matching hole in a handle to lock the switch in the OFF position. In a formed handle lock-off design, a tab in a cover flange is formed into the lock-off position. This eliminates the need of a separate handle guard reducing cost and complexity of the system. The above discussed, advantages and details of this invention below will be appreciated and understood by those skilled in the art from the following detailed description and drawings.

In accordance with one illustrative embodiment of the present invention, an enclosed switch is provided. It comprises an operating handle with a first hole situated at a distal end and an enclosure including a cover. The operating handle is disposed external to the enclosure. The cover having a flange including a tab formed with a second hole that is configured to be aligned with the first hole of the operating handle in order to lock the enclosed switch in an OFF position without the use of a handle guard.

In accordance with one illustrative embodiment of the present invention, a bus plug or a panelboard switch are provided. They comprise an operating handle with a first hole situated at a distal end and an enclosure including a cover. The operating handle is disposed external to the enclosure. The cover has a flange including a tab formed with a second hole that is configured to be aligned with the first hole of the operating handle in order to lock the bus plug or the panelboard in an OFF position without the use of a handle guard.

In accordance with another illustrative embodiment of the present invention, a method of locking an enclosed switch is provided. The method comprises providing an operating handle with a first hole situated at a distal end and providing an enclosure including a cover. The operating handle is disposed external to the enclosure. The cover has a flange including a tab formed with a second hole that is configured to be aligned with the first hole of the operating handle in order to lock the enclosed switch in an OFF position without the use of a handle guard.

DETAILED DESCRIPTION

Figure 1:
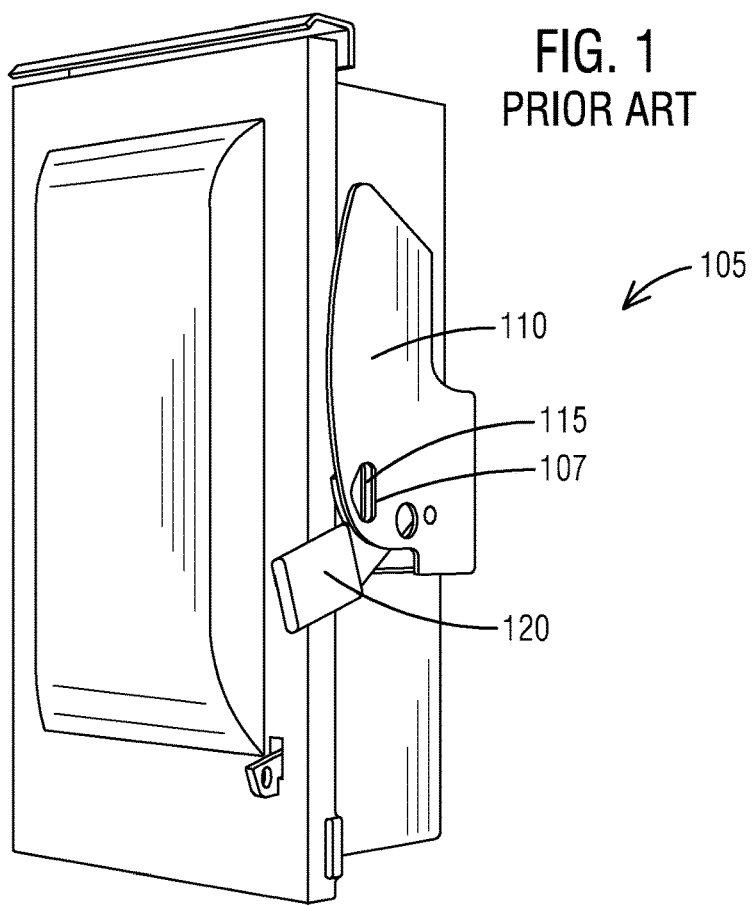
FIG. 1 illustrates a perspective view of a general duty switch from prior art that uses a hole in a handle guard and a matching hole in a handle to lock the switch in the OFF position.

To facilitate an understanding of embodiments, principles, and features of the present invention, they are explained hereinafter with reference to implementation in illustrative embodiments. In particular, they are described in the context of a simplified means to lock an enclosed switch, a bus plug or a panelboard switch. A general duty enclosed switch includes a cover with means for locking the enclosed switch to ensure that an operating handle is locked in an OFF position. The general duty enclosed switch does not use a hole in a handle guard but only uses a matching hole in a handle to lock the switch in the OFF position. A tab with a hole in a cover flange is formed into the lock-off position. The general duty enclosed switch uses the hole in the tab and a matching hole in an operating handle to lock the switch in the OFF position. The advantages of this design are reduced part numbers, reduced part cost and reduced assembly cost and time. Such a formed handle lock-off design can be incorporated in a bus plug or a panelboard switch also.

Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of a formed handle lockout for locking an enclosed switch, a bus plug or a panelboard switch according to the present disclosure are described below with reference to FIGS. 1-8 herein. Like reference numerals used in the drawings identify similar or identical elements throughout the several views. The drawings are not necessarily drawn to scale.

Consistent with one embodiment of the present invention, FIG. 1 represents a perspective view of a general duty enclosed switch 105 from prior art that uses a hole 107 in a handle guard 110 and a matching hole 115 in an operating handle 120 to lock the switch 105 in an OFF position but has been modified by the present invention to not use the hole 107 in the handle guard 110. The switch 105 is required by Underwriters Laboratories (UL) to have a provision to enable the operating handle 120 to be locked in the OFF position. The switch 105 uses the hole 107 in the handle guard 110 to lock the switch in the OFF position. The disadvantages of this design are increased part numbers, increased part cost and increased assembly cost and time.

Figure 2:
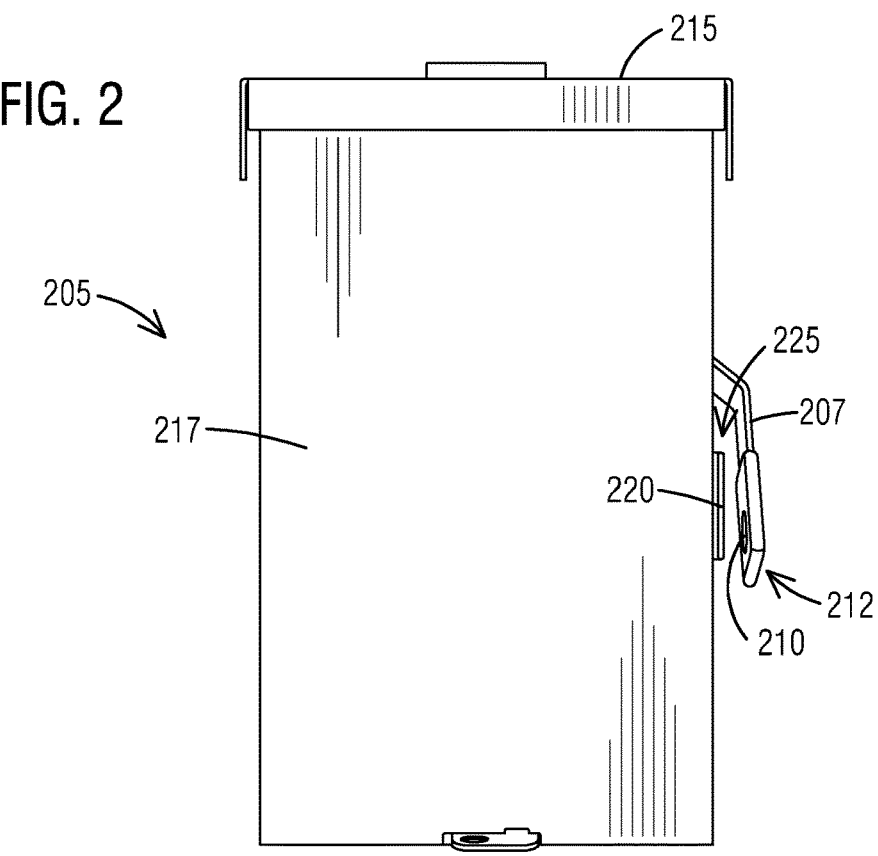
FIG. 2 illustrates a front view of a general duty enclosed switch in accordance with an exemplary embodiment of the present invention.

Referring to FIG. 2, it illustrates a front view of a general duty enclosed switch 205 in accordance with an exemplary embodiment of the present invention. The enclosed switch 205 comprises an operating handle 207 with a first hole 210 situated at a distal end 212. The enclosed switch 205 further comprises an enclosure 215 including a cover 217. The operating handle 207 is disposed external to the enclosure 215. The cover 217 includes a flange (not seen) including a tab 220 formed with a second hole (not seen) that is configured to be aligned with the first hole 210 of the operating handle 207 in order to lock the enclosed switch 205 in an OFF position without the use of the handle guard 110.

The operating handle 207 is on a center line and at a gap 225 from the tab 220. The operating handle 207 is configured to pivot in an OFF position to enable the operating handle 207 to be locked in the OFF position in order to lock the enclosed switch 205 in a lock-off position.

In one embodiment, the enclosed switch 205 is a 30 amp to a 1200 amp general duty switch configured for service entrance applications. The enclosed switch 205 is also consistent with one or more standards such as UL standards 98, 50 (13$^{th}$ edition).

Figure 3:
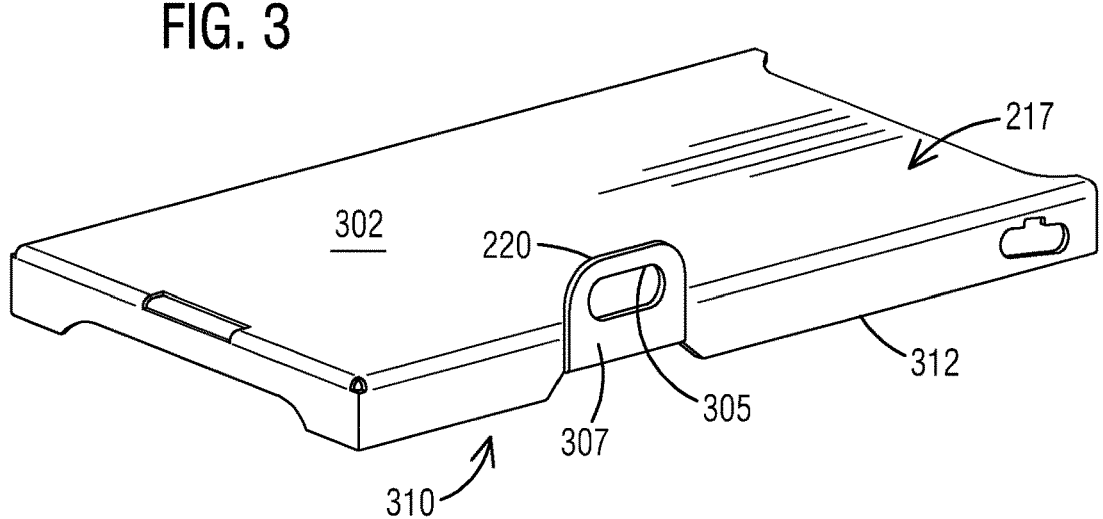
FIG. 3 illustrates a perspective view of the cover of the general duty enclosed switch of FIG. 2 in accordance with an exemplary embodiment of the present invention.

Turning now to FIG. 3, it illustrates a perspective view of the cover 217 of the general duty enclosed switch 205 of FIG. 2 in accordance with an exemplary embodiment of the present invention. The cover 217 includes a top surface 302 such that the tab 220 is formed extending away from the top surface 302 so that a second hole 305 is placed above the top surface 302. The tab 220 may be formed by bending a portion 307 of a flange 310 where the flange 310 has a longer length than a non-bent portion 312 of the flange 310. The cover 217 of the enclosed switch 205 may be made of a metal such as steel.

Figure 4:
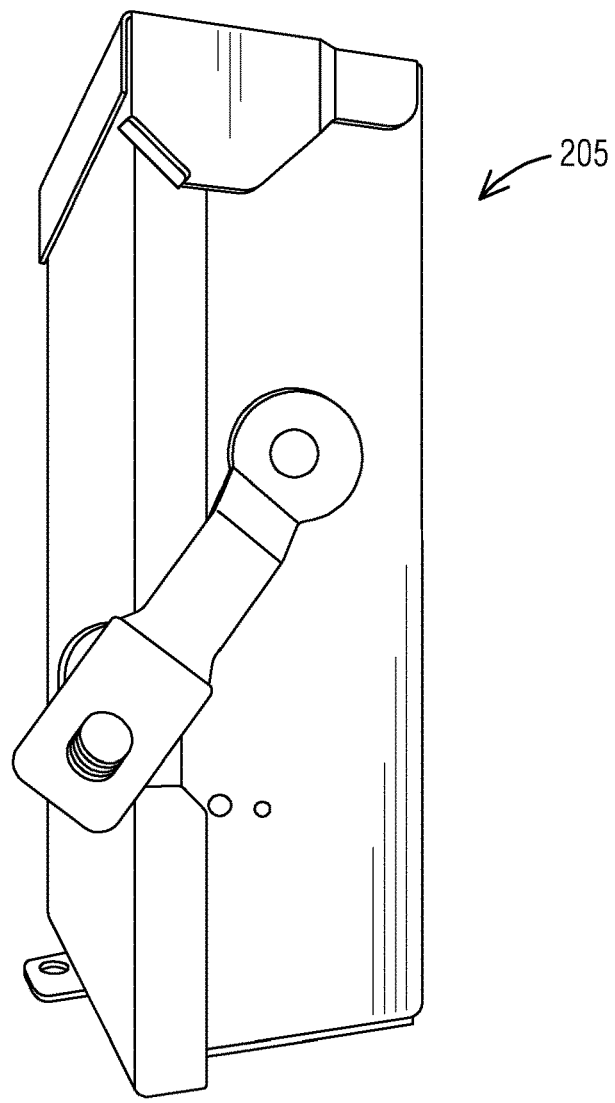
FIG. 4 illustrates a side view of the general duty enclosed switch of FIG. 2 in accordance with an exemplary embodiment of the present invention.

FIG. 4 illustrates a side view of the general duty enclosed switch 205 of FIG. 2 in accordance with an exemplary embodiment of the present invention. The enclosed switch 205 may be intended for applications where reliable performance and continuity of service are needed, but where duty requirements are not severe and usual service conditions prevail. (These switches are intended for use primarily with supply circuits rated 240V AC or less where the available fault current is less than 100,000 A when used with Class R or T fuses or 10,000 A max. when used with Class H fuses.) The enclosed switch 205 features a quick make, quick break visible blade switching action. All copper current carrying parts except for lugs are constructed from copper. The enclosed switch 205 may be both load break and HP rated. The enclosed switch 205 may be UL98 listed. The enclosed switch 205 may be made available in 2 and 3 pole versions and in both fusible and non-fusible designs. Both Type 1 and 3 R enclosures may be offered. The enclosed switch 205 can be used for both branch and for service entrance applications.

Figure 5:
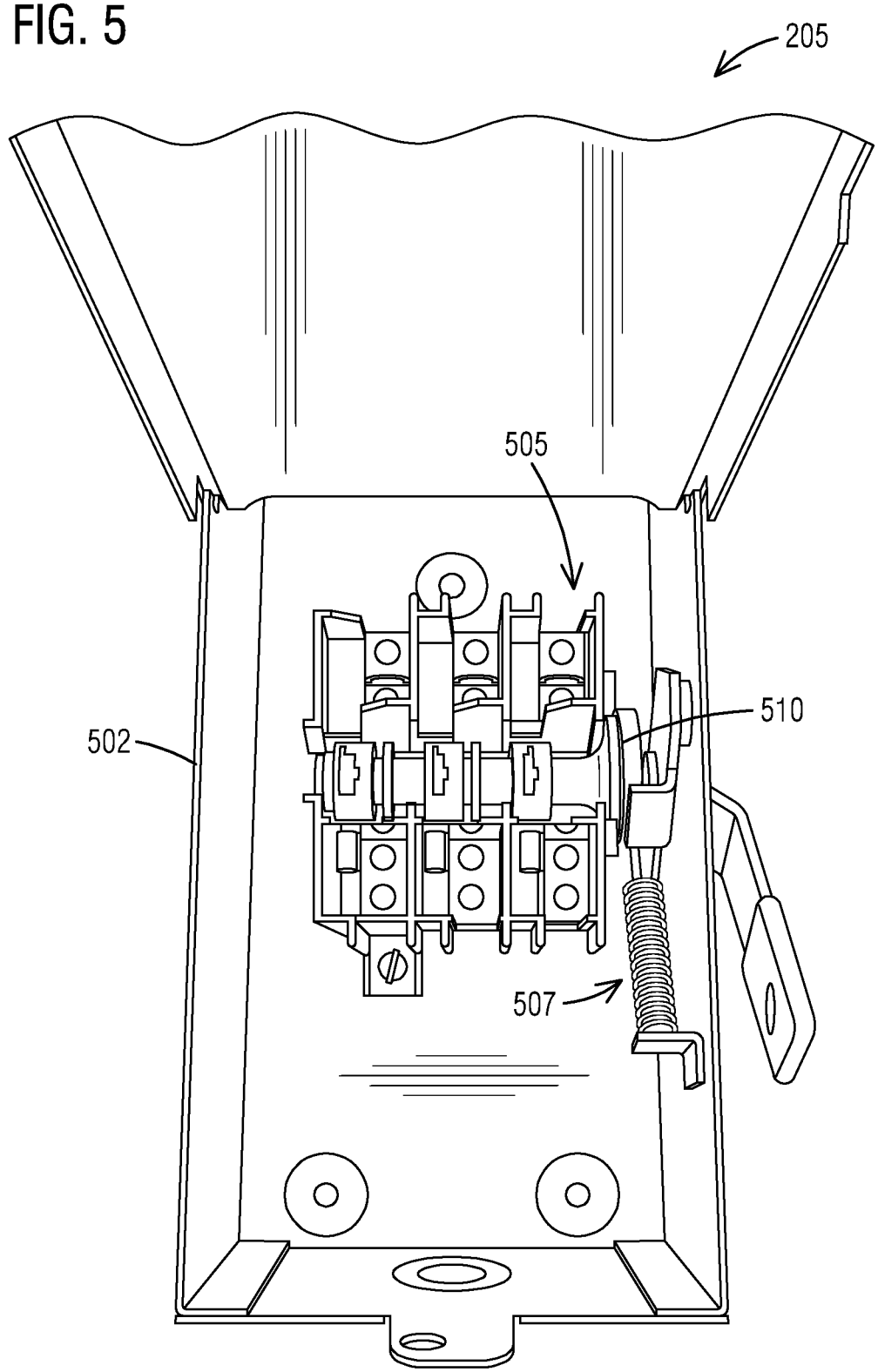
FIG. 5 illustrates internal details of the general duty enclosed switch of FIG. 2 in accordance with an exemplary embodiment of the present invention.

As seen in FIG. 5, it illustrates internal details of the general duty enclosed switch 205 of FIG. 2 in accordance with an exemplary embodiment of the present invention. The enclosed switch 205 further comprises a box 502 including a line base 505 and a switch mechanism 507 with an operating shaft 510. The switch mechanism 507 turns the line base 505 ON or OFF to turn ON or turn OFF power. The operating handle 207 is coupled to the operating shaft 510 to pivot in an ON position or an OFF position.

Figure 6:
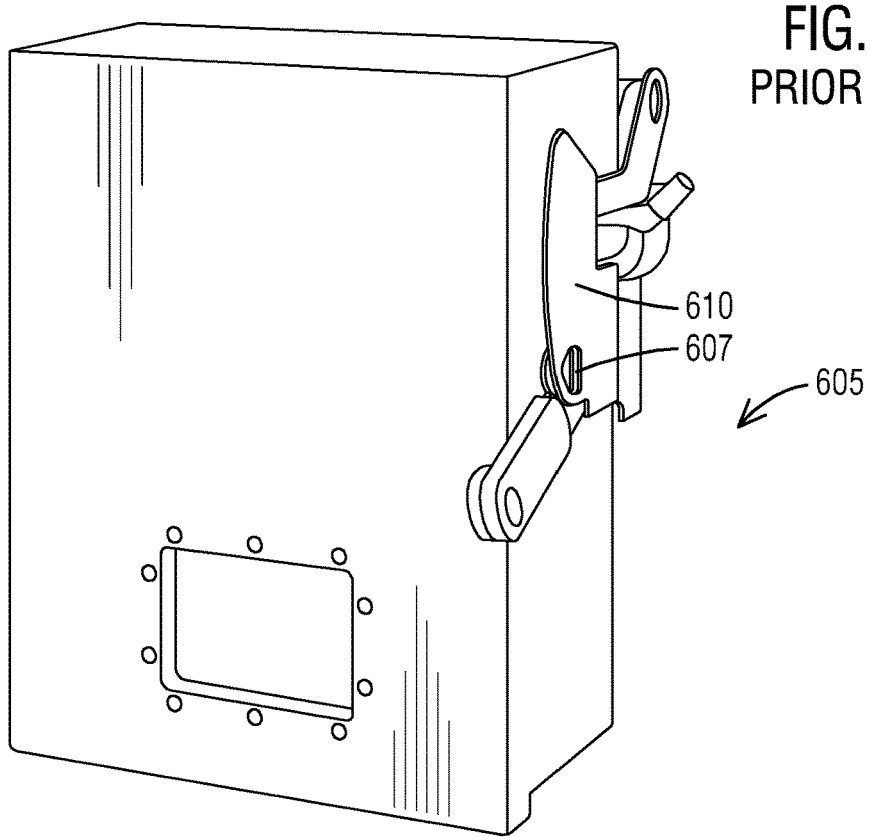
FIG. 6 illustrates a bus plug from prior art.

As shown in FIG. 6, it illustrates a bus plug 605 from the prior art. The bus plug 605 connects to a busbar or a busway to provide a localized power distribution to electronic devices, while protecting and supplying power to industrial equipment. Circuit protection for the bus plug 605 may be in the form of a circuit breaker or a fuse. The bus plug 605 has been modified by the present invention to not use a hole 607 in a handle guard 610. The bus plug 605 has been modified to use the second hole 305 in the tab 220 and the matching hole 115 in the operating handle 207 to lock the bus plug 605 in the OFF position.

Figure 7:
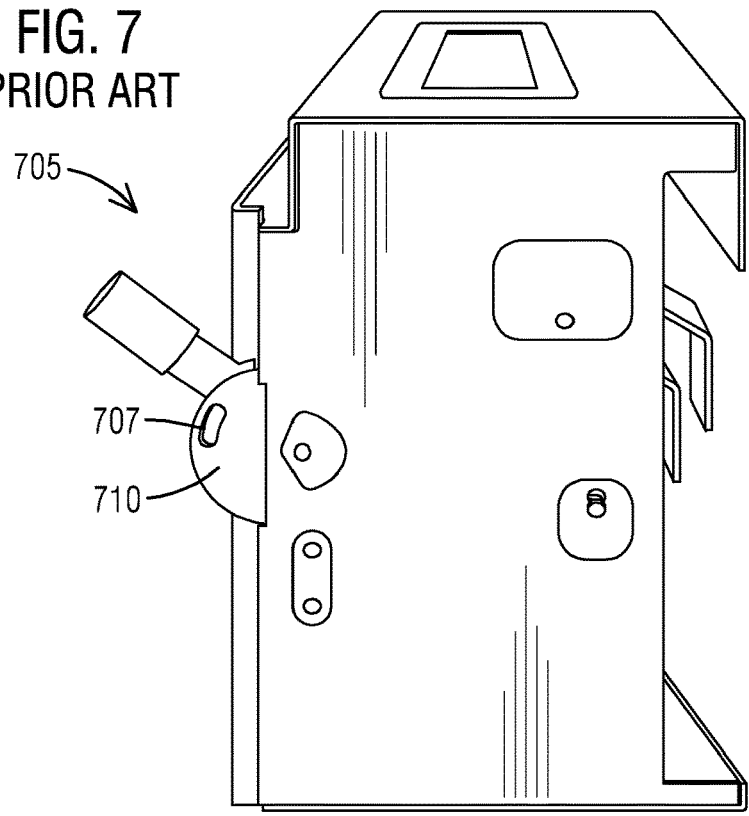
FIG. 7 illustrates a panelboard switch from prior art.

In FIG. 7, it illustrates a panelboard switch 705 from the prior art. A distribution board (also known as panelboard, breaker panel, or electric panel) is a component of an electricity supply system that divides an electrical power feed into subsidiary circuits, while providing a protective fuse or circuit breaker for each circuit in a common enclosure. Normally, a main switch, and in recent boards, one or more residual-current devices (RCD) or residual current breakers with overcurrent protection (RCBO), are also incorporated. The panelboard switch 705 has been modified by the present invention to not use a hole 707 in a handle guard 710. The panelboard switch 705 has been modified to use the second hole 305 in the tab 220 and the matching hole 115 in the operating handle 207 to lock the panelboard switch 705 in the OFF position.

Figure 8:
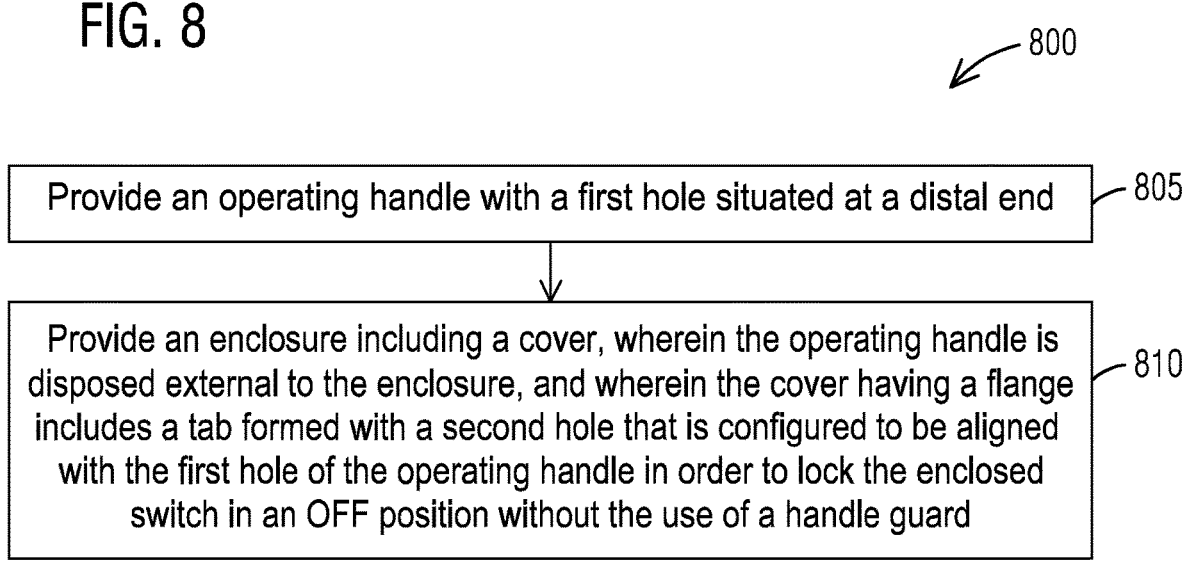
FIG. 8 illustrates a schematic view of a flow chart of a method of locking an enclosed switch in accordance with an exemplary embodiment of the present invention.

With regard to FIG. 8, it illustrates a schematic view of a flow chart of a method 800 of locking the enclosed switch 205 in accordance with an exemplary embodiment of the present invention. Reference is made to the elements and features described in FIGS. 1-7. It should be appreciated that some steps are not required to be performed in any particular order, and that some steps are optional.

For locking the enclosed switch 205, the method 800 in step 805 provides an operating handle with a first hole situated at a distal end. The method 800 further includes a step 810 of providing an enclosure including a cover. The operating handle is disposed external to the enclosure. The cover has a flange including a tab formed with a second hole that is configured to be aligned with the first hole of the operating handle in order to lock the enclosed switch in an OFF position without the use of a handle guard.

While a general duty enclosed switch is described here a range of one or more other enclosed switch means or other forms of enclosed switches are also contemplated by the present invention. For example, other types of enclosed switches may be implemented based on one or more features presented above without deviating from the spirit of the present invention.

The techniques described herein can be particularly useful for the formed handle lockout. While particular embodiments are described in terms of the formed handle lockout, the techniques described herein are not limited to such a structure but can also be used with other mechanical structures or configurations such as welded or riveted designs.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An enclosed switch having a first side and a second side, comprising:

an operating handle with a first hole situated at a distal
end, wherein the operating handle is installed pivotally
on the second side of the enclosed switch; and
an enclosure including a cover,
wherein the operating handle is disposed external to the
enclosure, and
wherein the cover having a flange including a tab formed
with a second hole that is configured to be aligned with
the first hole of the operating handle in order to lock the
enclosed switch in an OFF position without the use of
a handle guard,
wherein the cover having a top surface such that the tab
is formed extending away from the top surface so that
the second hole is placed above the top surface,
wherein the tab is formed by bending a portion of the
flange where the flange having a longer length than a
non-bent portion of the flange,
wherein the tab is extending opposite the non-bent portion
of the flange in a same plane in which the non-bent
portion of the flange is extending, wherein the same
plane is substantially parallel to the second side of the
enclosed switch.

2. The enclosed switch of claim 1, further comprising:
a box including a line base and a switch mechanism with
an operating shaft,
wherein the switch mechanism turns the line base ON or
OFF to turn ON or turn OFF power.

3. The enclosed switch of claim 2, wherein the operating handle is coupled to the operating shaft to pivot in an ON position or an OFF position.

4. The enclosed switch of claim 3, wherein the operating handle is on a center line and at a gap from the tab.

5. The enclosed switch of claim 3, wherein the operating handle is configured to pivot in the OFF position to enable the operating handle to be locked in the OFF position in order to lock the enclosed switch in a lock-off position.

6. The enclosed switch of claim 1, wherein the enclosed switch is a 30 amp to a 1200 amp general duty switch configured for service entrance applications.

7. The enclosed switch of claim 1, wherein the enclosed switch is consistent with UL standards 98, 50 (13$^{th}$ edition).

8. The enclosed switch of claim 1, wherein the cover of the enclosed switch is made of a metal.

9. A bus plug or a panelboard switch having a first side and a second side, comprising:
an operating handle with a first hole situated at a distal
end, wherein the operating handle is installed pivotally
on the second side of the bus plug or the panelboard;
and
an enclosure including a cover,
wherein the operating handle is disposed external to the
enclosure, and
wherein the cover having a flange including a tab formed
with a second hole that is configured to be aligned with
the first hole of the operating handle in order to lock the
bus plug or the panelboard in an OFF position without
the use of a handle guard,
wherein the cover having a top surface such that the tab
is formed extending away from the top surface so that
the second hole is placed above the top surface,
wherein the tab is formed by bending a portion of the
flange where the flange having a longer length than a
non-bent portion of the flange,
wherein the tab is extending opposite the non-bent portion
of the flange in a same plane in which the non-bent
portion of the flange is extending, wherein the same
plane is substantially parallel to the second side of the
bus plug or the panelboard.

10. The bus plug or the panelboard switch of claim 9, wherein the cover of the bus plug or the panelboard switch is made of a metal.

11. A method of locking an enclosed switch having a first side and a second side, the method comprising:
providing an operating handle with a first hole situated at
a distal end, wherein the operating handle is installed
pivotally on the second side of the enclosed switch; and
providing an enclosure including a cover,
wherein the operating handle is disposed external to the
enclosure, and
wherein the cover having a flange including a tab formed
with a second hole that is configured to be aligned with
the first hole of the operating handle in order to lock the
enclosed switch in an OFF position without the use of
a handle guard,
wherein the cover having a top surface such that the tab
is formed extending away from the top surface so that
the second hole is placed above the top surface,
wherein the tab is formed by bending a portion of the
flange where the flange having a longer length than a
non-bent portion of the flange,
wherein the tab is extending opposite the non-bent portion
of the flange in a same plane in which the non-bent
portion of the flange is extending, wherein the same
plane is substantially parallel to the second side of the
enclosed switch.

12. The method of claim 11, further comprising:
providing a box including a line base and a switch
mechanism with an operating shaft,
wherein the switch mechanism turns the line base ON or
OFF to turn ON or turn OFF power.

13. The method of claim 11, wherein the cover of the enclosed switch is made of a metal.

14. The method of claim 11, wherein the enclosed switch is a 30 amp to a 1200 amp general duty switch configured for service entrance applications.

* * * * *